H. K. FORD.
BAKING-PAN.

No. 178,622.  Patented June 13, 1876.

Attest:
R. H. Eddy
J. R. Snow

Inventor:
Horace K. Ford

UNITED STATES PATENT OFFICE.

HORACE K. FORD, OF HAVERHILL, MASSACHUSETTS.

IMPROVEMENT IN BAKING-PANS.

Specification forming part of Letters Patent No. 178,622, dated June 13, 1876; application filed May 13, 1876.

*To all whom it may concern:*

Be it known that I, HORACE K. FORD, of Haverhill, of the county of Essex and State of Massachusetts, have invented a new and useful Improvement in Pans for Making Bread; and do hereby declare the same to be fully described in the following specification and represented in the accompanying drawings, of which—

Figure 1:
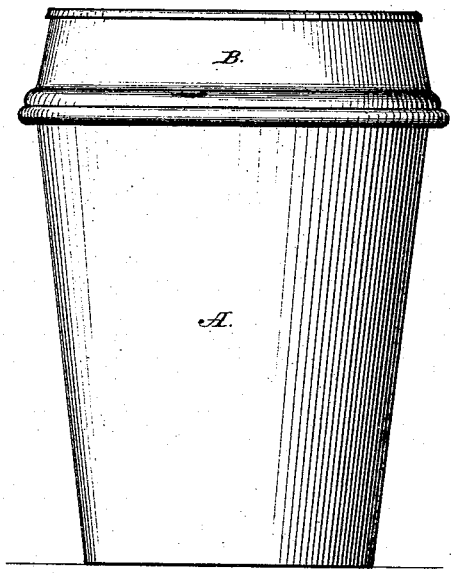
Figure 2:
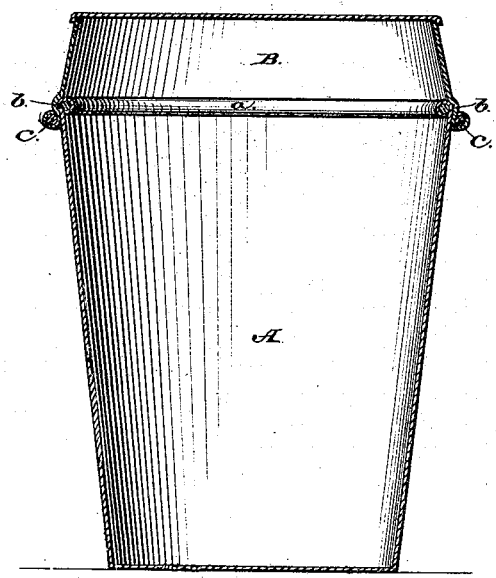
Figure 3:
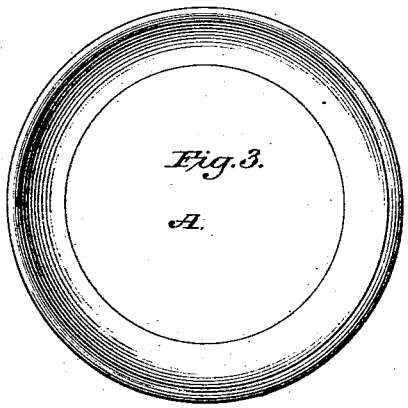
Figure 4:
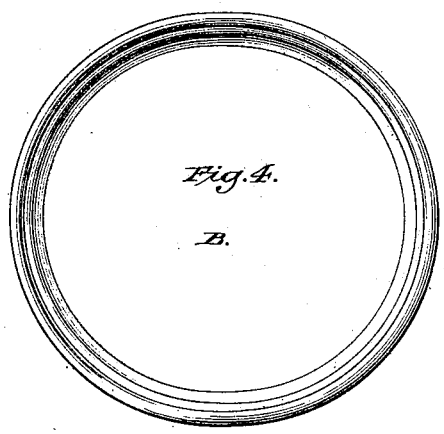

Figure 1 is a side view, and Fig. 2 a vertical and transverse section, of one of my improved pans. Fig. 3 is a top view of its body. Fig. 4 is a bottom view of its cover.

My invention relates to bread-pans provided with covers to their bodies.

Heretofore, in making such pans the covers, so far as I have been able to learn, have been fitted loosely upon the bodies, and provided with no means of holding them in place against the tendency of the dough, while being baked, to force them upward, and spread out and run over the edges of the mouth of the bodies of the pans.

Furthermore, the covers have been cylindrical, or had their sides at right angles with their tops, in which case the upper part of the loaf of bread is liable to become caught in the cover, and to become separated from the rest of the loaf during the removal of the cover from the body.

To overcome such difficulties is the object of my invention, my improved bread-pan being specially intended for the baking of what is termed in the New England States "brown-bread," or bread made of maize or rye and maize, though it is equally useful for bread made of wheat or other flour.

In using the pan, the baker has to put into it the proper amount of dough, and to leave sufficient room in the pan for the expansion of such dough while it may be in the act of being baked, the object being to have the loaf, when baked, sufficiently light or expanded, and to fill the cover and body without waste over the sides of the latter.

In constructing my improved bread-pan, the body A, as represented in the drawings, has the form of a conic frustum, with its mouth at the larger end, and provided with a head or flange, $a$, extending around it, and projecting from the sides of the body, as shown.

The top B, instead of being cylindrical, and fitting very loosely upon the mouth of the body, should be conical, tapering, or dome-shaped in form, or should narrow from its mouth upward, as shown, and also should have a groove, $b$, made around its sides, near its mouth, or arranged relatively thereto as represented, such groove being to receive the flange-bead of the mouth of the body.

The mouth of the cover, instead of being circular, like the mouth of the body, should be slightly elliptical or elongated in one direction diametrically, and of sufficient size to enable the cover while being forced down over the mouth, and upon the flange or bead $a$ of the body, to expand at its shorter diameter, so as to pass down by the said flange, and next contract, so as to grasp within the groove the flange $a$ at opposite parts thereof, so as to cause the cover to be held in connection with the body by the flange and the groove, the cover below the groove or at the edge of the mouth being beaded and wired, as shown at $c$.

While a sudden blow or pressure on the side or bead of the cover will easily cause such cover to expand and become detached from the body, it (the cover) will be held in place with sufficient force to prevent it from being forced off the body by the dough while the latter is being baked.

Thus, it will be seen that with my improvement not only will the dough while being baked be confined in the pan, and prevented from throwing off the cover, but, in case of such dough having become packed into the cover, there will be little or no danger of breakage apart of the loaf by the removal of the cover from the body of the pan.

I claim as my invention—

The improved article of manufacture, or baking-pan, made substantially as described— viz., with the mouth of its body circular and beaded or flanged, as shown, and with its cover tapering, and having its mouth elongated and beaded, and provided with a groove, all essentially as and for the purpose or purposes as set forth.

HORACE K. FORD.

Witnesses:
R. H. EDDY,
J. R. SNOW.